Nov. 2, 1926.
H. L. BRUEN
FAUCET CONNECTER
Filed Sept. 21, 1923
1,605,577
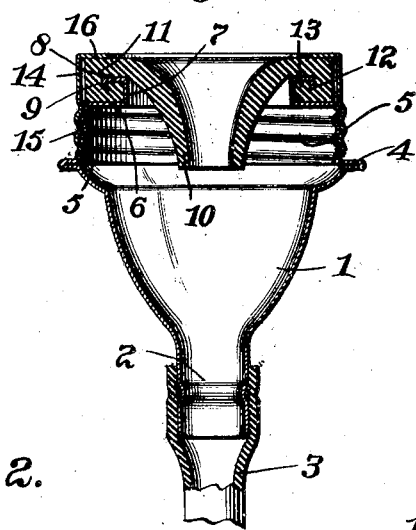
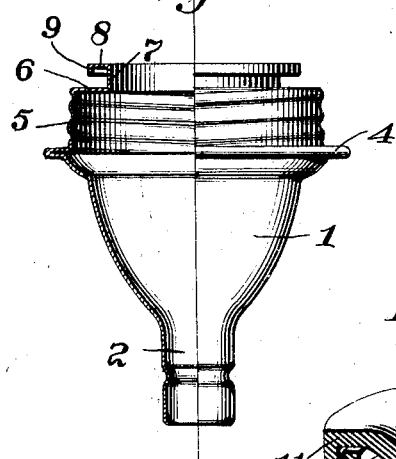
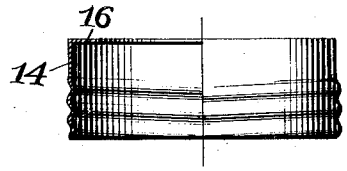
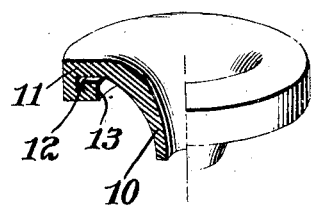
Inventor:
Henry L. Bruen,
by Dodge
Attorneys Patented Nov. 2, 1926.

1,605,577

UNITED STATES PATENT OFFICE.

HENRY L. BRUEN, OF ORANGE, NEW JERSEY.

FAUCET CONNECTER.

Application filed September 21, 1923. Serial No. 664,043.

This invention peratins to an improved connection for bath sprays and the like. The present structure is an improvement upon that set forth in Letters Patent No. 846,905, granted to me under date of March 12, 1907. While the structure set forth in that patent has given in general satisfactory results, instances have occurred where the gasket or washer has been forced out of position, rendering the structure inoperative and likewise causing annoyance to the user and a splashing of the water.

The present invention provides means whereby the gasket is more securely locked in place and its displacement in the act of positioning of the connecter upon a faucet or reducer is obviated.

In the drawing:

Fig. 1 is a vertical sectional view of the connecter;

Fig. 2 is a sectional elevation of the main body of the structure with the gasket and retaining cap removed;

Fig. 3 a like view of the retaining cap; and

Fig. 4 a perspective view partly in section of the gasket.

In said figures 1 denotes the main body of the connecter provided at its lower end with a reduced neck 2 over which the ordinary rubber tubing as 3 is drawn. The body is produced from sheet metal spun to form, and adjacent its upper end is provided with an outwardly extending annular shoulder 4 formed by bending the metal back upon itself. Arising from said shoulder is an annular threaded section 5 and above this is an inwardly projecting shoulder 6 from the inner edge of which there is an upwardly extending wall or collar 7.

The metal at the upper end of the collar is bent outwardly, forming a flat face or flange 8, and the edge of the material is then turned downwardly forming a downwardly extending lip 9. Thus it will be seen that there is produced at the upper end of the connecter an annular pocket formed by the shoulder 6, the wall or collar 7, the flange 8 and the downwardly extending lip 9.

The gasket, best shown in Fig. 4, is produced from rubber molded to the desired form and has a downwardly extending contracted tubular portion 10 as is usual, the upper portion of which merges into the annular body 11, which is provided on its under side with an annular inverted L-shaped groove 12, thus producing what may be termed an upwardly extending flange or lip 13.

In assembling the parts, this lip or flange 13 is sprung under downwardly extending lip 9 so that the flange 13 seats itself in the pocket formed at the upper end of the connecter as above described and as shown in Fig. 1. There is thus produced an interlock between the upper end or head of the gasket and the upper end of the connecter 1. While such interconnection might be sufficient for ordinary usage, it is deemed advisable to employ a cap piece to securely hold the gasket in place. Such cap is shown in Figs. 1 and 3 and is denoted generally by 14. It has a downwardly extending threaded portion 15 and an inwardly extending flange 16. The threaded portion is designed to engage the threaded portion 5 of the head, the shoulder 4 forming a stop to prevent the cap from being screwed down too far. The inwardly extending flange 16 as will be best seen upon reference to Fig. 1, contacts the upper face of the body 11.

The members 7, 8 and 9 form in effect an annular flange which is complemental to the groove 12 of the gasket. In other words, the flange on the connecter enters and fills the groove 12 and embraces and encloses the flange on the gasket.

From the foregoing it will be seen that the flange on the upper part of the connecter 1 forms an interlock with the flange on the gasket and this interlocking relation is maintained at all times by the presence of the cap 14 which prevents the flange 13 from being stretched and curled outwardly, and withdrawn from the flange on the head when the gasket is forced onto or withdrawn from the faucet or connecter.

What is claimed is:

1. In a hose connecter for bath sprays, the combination of a hollow body provided with an upstanding threaded portion; a flange located above said portion having a downwardly extending lip, said flange and lip lying within the circumferential limits of the threaded portion; a gasket having a centrally disposed faucet engaging element and likewise provided with an annular upwardly extending flange on its under face adjacent the periphery thereof, said flange engaging the flange and lip on the body portion; and a cap having engagement with the upstanding threaded portion aforesaid and bearing upon the upper face of the gasket over the flanges and likewise preventing lateral outward displacement of the flange of the gasket.

2. In a hose connecter for bath sprays, the combination of a hollow body; an annular upstanding flange formed as an integral portion of said body, said flange being of a diameter less than that of the body and likewise having a depending lip also of a diameter less than that of the body; and a gasket having a centrally disposed faucet engaging element, and an L-shaped groove formed in its underface engaging the flange and lip aforesaid and making a locking engagement therewith.

3. In a hose connecter for bath sprays, the combination of a hollow body provided with an annular flange at its upper end, said flange having a depending lip, said flange and lip lying within the circumferential limits of the hollow body; a gasket having a centrally disposed faucet engaging element and an annular L-shaped groove formed in its under face engaging the flange and lip aforesaid and making a locking engagement therewith; and means secured to the body and overlying the upper marginal portion of the gasket for additionally securing the gasket in place and likewise preventing lateral outward displacement of the flange of the gasket.

4. In a hose connecter for bath sprays, the combination of a hollow body provided with an upstanding threaded portion, a horizontally-disposed shoulder projecting inwardly therefrom, an upstanding collar formed as an extension of the inward portion of said shoulder, an outwardly extending flange formed around the upper portion of said collar, a downwardly extending annular lip formed at the periphery of said flange, said last-named collar, flange and lip lying within the circumferential limits of the threaded portion; a gasket having a centrally disposed faucet engaging element and likewise provided with an annular upwardly extending flange on its underface adjacent the periphery thereof, said flange engaging the shoulder, the collar, the flange and the lip aforesaid, the body of the gasket overlying the body flange.

In testimony whereof I have signed my name to this specification.

HENRY L. BRUEN.